United States Patent
Morgan

Patent Number: 5,288,760
Date of Patent: Feb. 22, 1994

[54] SEPARATION AND SALVAGE OF COMPONENTS OF PARTS

[75] Inventor: Jack W. Morgan, Brighton, Mich.

[73] Assignee: Ford Motor Company, Dearborn, Mich.

[21] Appl. No.: 937,270

[22] Filed: Aug. 31, 1992

[51] Int. Cl.$^5$ .................................................. C08J 11/06
[52] U.S. Cl. ........................................ 521/40; 521/40.5; 521/41; 521/46.5; 521/49; 241/DIG. 37
[58] Field of Search .......................... 521/40, 40.5, 41

[56] References Cited

U.S. PATENT DOCUMENTS

| | | | |
|---|---|---|---|
| 2,879,005 | 3/1959 | Jarvis | 241/24 |
| 3,652,466 | 3/1972 | Hittel et al. | 521/46 |
| 3,843,060 | 10/1974 | Colburn | 241/24 |
| 3,925,200 | 12/1975 | Izumi et al. | 209/9 |
| 3,985,650 | 10/1976 | Saitoh et al. | 241/15 |
| 4,067,826 | 1/1978 | Emery | 521/46.5 |
| 4,105,593 | 8/1978 | Stavrinou | 521/46.5 |
| 4,119,533 | 10/1978 | Saitoh et al. | 209/155 |
| 4,148,702 | 4/1979 | Lane | 521/46.5 |
| 4,160,749 | 7/1979 | Schneider et al. | 521/49.5 |
| 4,167,477 | 9/1979 | Valdez et al. | 209/166 |
| 4,342,647 | 8/1982 | McMillan et al. | 241/24 |
| 4,382,108 | 5/1983 | Carroll et al. | 428/326 |
| 4,602,046 | 7/1986 | Buser et al. | 521/46 |
| 4,617,111 | 10/1986 | Grimm et al. | 521/46.5 |
| 4,981,876 | 1/1991 | Grimmer | 521/45 |

FOREIGN PATENT DOCUMENTS 0068502  1/1983  European Pat. Off. ............. 521/40

*Primary Examiner*—Paul R. Michl
*Assistant Examiner*—Olga Asinovsky
*Attorney, Agent, or Firm*—Damian Porcari; Roger L. May

[57] ABSTRACT

Laminated scrap produced by a reaction injection molding process, comprising a thermoplastic resin substrate and a vinyl skin, together with a polyurethane foam layer disposed therebetween, is ground with cryogenic coating. Thereafter, the granulated particles of the scrap lamination are passed serially through density-based separators to separate the laminated layers. The method and apparatus of the invention permit the separation of the layers of such scrap parts, such that one or more of the constituent parts may be recovered.

15 Claims, 2 Drawing Sheets

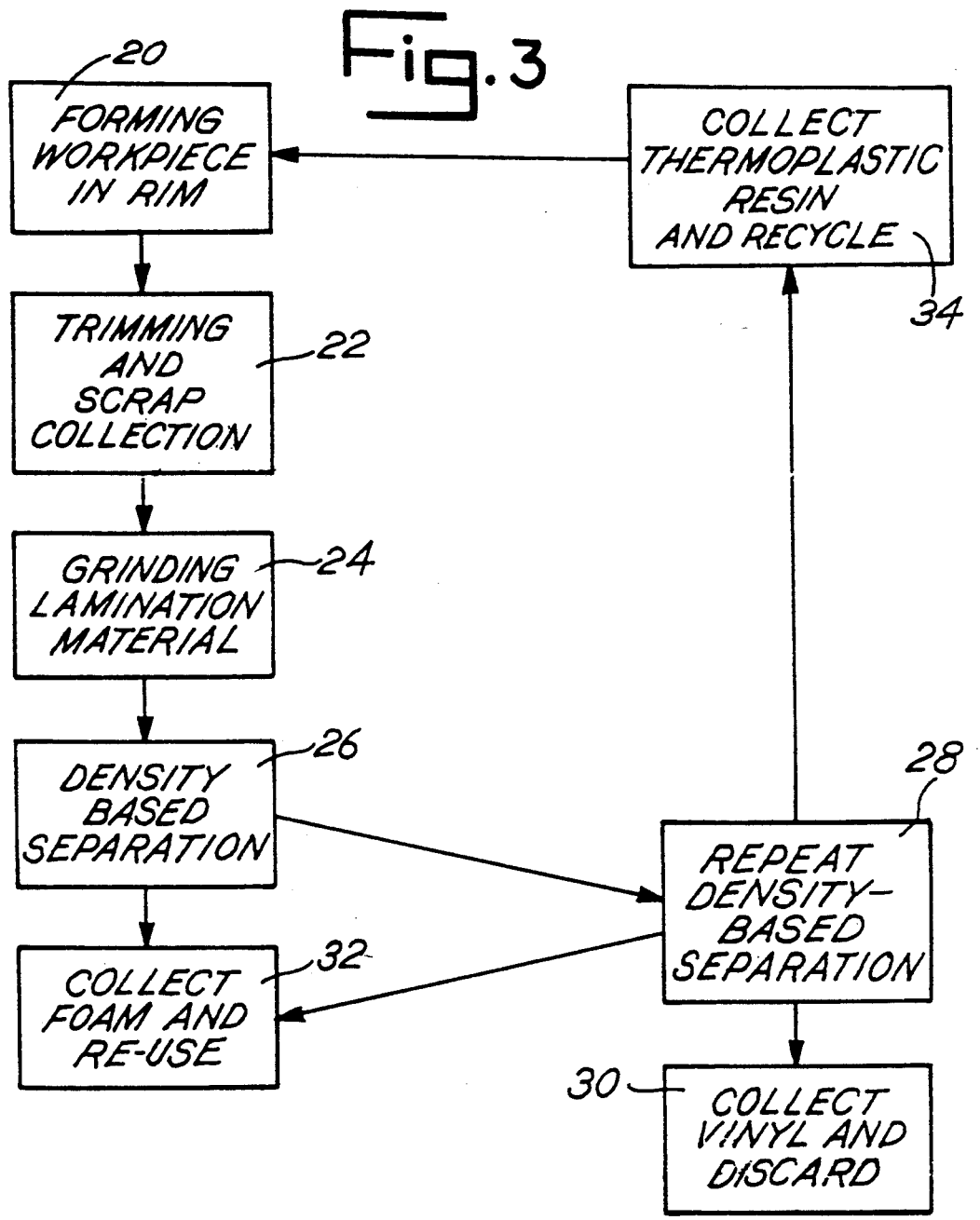
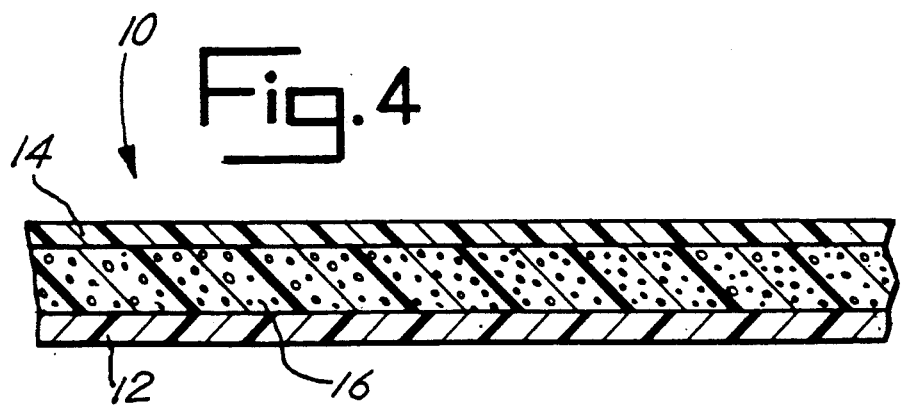

5,288,760

SEPARATION AND SALVAGE OF COMPONENTS OF PARTS

FIELD OF THE INVENTION

The present invention is directed in general to the separation and salvage of components of parts. More particularly, the improved method of the present invention concerns separating scrap lamination from a reaction injection molding process into individual components.

BACKGROUND OF THE INVENTION

It has been recognized, and especially in the past decade that solid waste disposal is a matter of genuine environmental concern. In particular, landfill sites which have been in previous use have in many instances approached complete filling. Accordingly, the opening of additional landfill sites for disposal of various waste products has been necessary. This exhaustion of available landfill space for various waste components has resulted in higher disposal fees. Moreover, transportation costs for disposal of such waste products have increased because of the longer distances to be travelled to revised landfill sites In addition to the increase in economic costs for disposal waste products, solid waste reduction programs have been evolving from voluntary status to one of legal obligation, based upon federal, state and local legislation to reduce solid waste disposal difficulties. Increased legislation in that regard is likely to compel further reduction of solid waste volumes.

In view of the above difficulties of disposal of solid waste products, recycling and salvage of at least some components of scrap materials has been desirable. However, certain difficulties have been associated with the separation and salvage of various individual components of laminated products, and particularly laminated products produced by a reaction injection molding process, such as are used in the automobile industry.

Reaction injected molds are utilized in the automobile and other industries to produce soft foam products having a substrate usually comprising one or more thermoplastic resins to provide rigidity, a skin which may be a vacuum formed or cast material, for example cast vinyl, to provide appearance and texture, and a foam interspersed therebetween to provide softness to the product. This particular form of product has created substantial difficulties in the industry in regard to separation and salvage of the individual components. Effective separation and salvage may yield reusable plastic resins and also perhaps potentially useable foam components.

Various techniques have been suggested for separating various types of polymeric scrap materials. For example, U.S. Pat. No. 3,843,060 to Colburn discloses a process for the reclamation of fabric-supported thermoplastic sheet scrap. The process involves granulating the fabric-supported thermoplastic sheet into a particulate mixture containing thermoplastic chips, chopped fabric, lint and fly. This mixture is fed into a cyclone wherein the lint and fly are separated, leaving a second mixture comprised primarily of thermoplastic chips and chopped fabric. Finally, this second mixture is separated into thermoplastic chip and chopped fabric components utilizing a specific gravity air separator.

U.S. Pat. No. 4,981,876 to Grimmer discloses a process for separating vinyl skin from a foam backing and recovering the separated components by granulating the composite into small chips and subjecting the chips to flotation separation.

Various "wet" processes require additional drying and other steps, and would increase engineering difficulty, costs, and create yet other problems, such as plasticization, solution disposal etc.

SUMMARY OF THE INVENTION

According to a first aspect of the present invention, means are provided for separating and salvaging individual components of parts produced by a reaction injection molding process. In particular, the laminated parts and various scrap produced by the reaction injection molding process comprise a thermoplastic resin substrate and a vinyl skin, together with a polyurethane foam layer disposed therebetween. This scrap lamination material is, according to the improved method of the present invention, first treated by reducing such scrap in a granulator which is cryogenically cooled in preferred embodiments, for example by liquid nitrogen. Thereafter, the granulated particles of the scrap lamination are passed serially through density-based separators to separate the laminated layers.

The improved methods and apparatus of the present invention function to permit the separation of previously inseparable layers of such scrap parts, such that at least the substrate (and in certain preferred embodiments the foam) may be recycled and reutilized.

These and other aspects of the improved methods of the present invention will be better understood by those of ordinary skill in the art upon review of the following brief description of drawing, detailed description of certain preferred embodiments, appended claims and accompanying drawings.

BRIEF DESCRIPTION OF THE DRAWING

The detailed description of certain preferred embodiments of the invention is provided below with reference to the accompanying drawings, wherein the same reference numeral is utilized for a given feature in all figures.

FIG. 3 is a schematic flow chart showing the steps of certain embodiments of the present invention.

FIG. 4 is a greatly enlarged fragmented schematic transverse cross-sectional view of a scrap laminate structure of the kind processed according to the methods of the present invention.

DETAILED DESCRIPTION OF PREFERRED EMBODIMENTS

Figure 1:
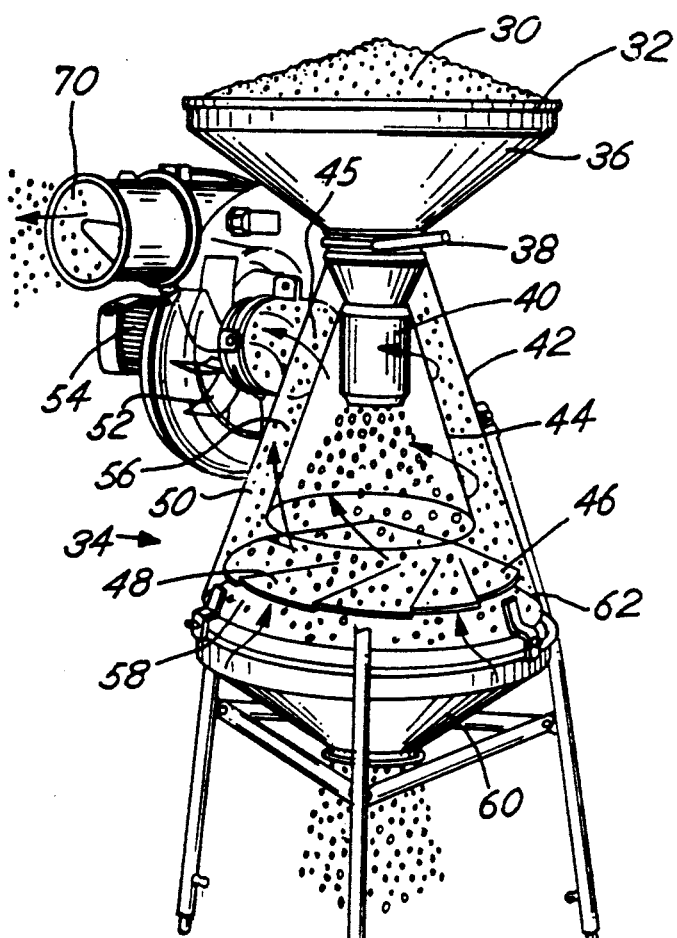
FIG. 1 is a perspective view of one form of separator which may be utilized in connection with the improved separation method of the present invention, and illustrates the parts of such cyclone separator utilizable for separating products having different densities based upon gravity drop of an aggregate of particles and aspiration of lighter particles from a thin layer of such aggregate.

In the description set forth hereinbelow and in the claims which follow, it should be understood that all directional terms including, for example, reference to an upper or lower surface of a component, are used for convenience and correspond generally to the orientation illustrated in the drawings. However, such terms are not meant to limit the invention to any particular configuration or use in any particular orientation.

In preferred embodiments, the improved method of the present invention is directed to separating scrap lamination formed by a reaction injection molding process into the various individual components thereof. In one preferred embodiment, soft foam products are manufactured by a reaction injection molding (RIM) process. Products produced by this process are laminates 10, generally comprised of three elements, as shown schematically in FIG. 4.

Substrate 12 may be one of several thermoplastic resins. Substrate 12 typically functions to provide rigidity to laminate 10. Skin 14 may be either vacuum formed material or cast material in certain embodiments, the function of which is to provide the desirable appearance and texture to laminate 10. Polyurethane or other foam 16 functions to provide softness and resiliency to laminate 10.

In a typical RIM process, a substrate 12 and a vinyl skin 14 are manually placed in an open mold. The mold is closed and a mixture of polyol and isocyanate is blended in a mixhead and injected into the mold. The resulting product of this exothermic reaction is a polyurethane foam 16 which bonds substrate 12 to vinyl skin 14 and provides the desired softness to the laminate 10. When the process is completed, the mold is opened and the laminate 10 in the form of a part is manually removed. Subsequent trimming operations remove unwanted scrap laminate material. Because this process creates a chemical bond between the foam and vinyl skin 14 and substrate 12, separation of the three components of laminate 10 is extremely difficult. Therefore, unusable scrap parts and offal from the trimming operations have heretofore often been regarded as unsalvageable and have been discarded in landfills, for example. The process of the present invention provides a method to separate these components of laminate 10, leading to possible reuse of one or more of the separate components.

As discussed more completely below, scrap parts and trimming offal are size-reduced in a granulator cooled by liquid nitrogen. The granulated material is passed through a series of density-based separators, e.g. cyclone separators, where the three components of laminate 10 (substrate 12, vinyl 14 and foam 16) are segregated. Some cross-contamination of these three recovery streams may be present, the degree of contamination varying with the operational parameters selected for the method. In preferred embodiments, at least substrate 12 may be suitable for recycling reuse in the same injection molding process by which it was created.

Referring now to the drawings, a reaction injection mold (RIM) is provided wherein a laminated workpiece is formed (step 20). As depicted schematically in FIG. 4, the laminated workpiece includes, as discussed, a lamination 10 of an inner foam layer 16 having a vinyl skin 14 on one side thereof and thermoplastic resin substrate 12 on the other side.

The scraps of laminated material are collected from trimmings of workpieces and from discarded workpieces (step 22). Such scrap laminated material is ground in the presence of a liquified gas to form an aggregate of interspersed foam, vinyl and thermoplastic resin particles (step 24). In preferred embodiments, the liquified gas may be liquid nitrogen, which is utilized because of its inert properties and its ready availability. However, other liquified gases may be utilized in alternative embodiments. Although the mechanism of functioning of such liquified gas is not entirely understood, it is presently believed that such liquid gas functions to prevent plasticization of the laminate material.

The ground aggregate material is then passed to a density-based separator (step 26), which may be of the cyclone- and/or aspirator-type, for collection of a first dense fraction therefrom comprising an enriched concentration of thermoplastic resin particles. One suitable density-based separator is as aspirator separator provided by Kongskilde of Exeter, Ontario, Canada, as shown in FIG. 1. Such Kongskilde aspirators remove dust and light particles while at the same time separating usable materials based upon density. Both model 20 (for moderate size tasks) and model 40 (for larger tasks) from Kongskilde are suitable. It will be within the ability of those skilled in the art, in view of the present disclosure, to set suitable operating parameters and to make any necessary adjustments to such aspirators for a given application. For example, the methods of the present invention have been carried out utilizing the Kongskilde Model 20 aspirator/separator, as shown in FIG. 1 hereof. Settings that were utilized on the Model 20 to the damper setting in the exhaust duct were from number 2 to number 9 settings. The aspirator side adjustment was varied from between 1/16 inch to 3/16 inches. The settings utilized for the Model 40 aspirator have not been determined, but the use thereof can be determined by those of ordinary skill in the art without undue experimentation.

As set forth in FIG. 1, an aggregate of particles 30 is charged to the top 32 of the separator generally 34 in an inlet bin thereof, which is closed by a rotary valve 38 at the bottom hereof. The aggregate particles 30 are dropped by gravity means through an inlet nozzle 40 into a large frusto-conical shaped reaction vessel 42, which contains a smaller similarly shaped frusto-conical shield 44 therein. The aggregate particles 30 fall from inlet nozzle 40 within the frusto-conical shield 44 onto a revolving aspiration tray 46 to create a very thin layer 48 of such particles which permits the fines 50 (shown resin at Arrows) comprising light materials and/or materials of low density to be vacuumed up by means of a vacuum fan 52 driven by a motor 54 connected to space 56 exterior of the frusto-conical shield 44 near the top 45 of reaction vessel 42.

Figure 2:
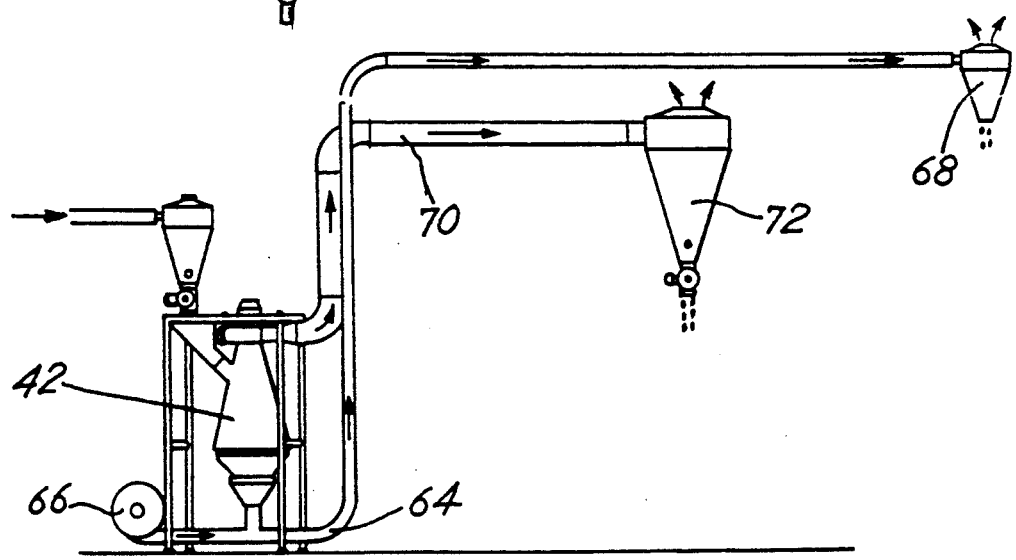
FIG. 2 illustrates, schematically, a side view of one preferred embodiment of the invention, showing bottom exiting thermoplastic particles of greater density, and top collected foam and/or vinyl particles of lower density.

The heavier and more dense particles 58 fall from the rotating lower fan blade shaped aspiration tray 46 into a collection funnel 60 disposed at the bottom 62 of the reaction vessel 42 for discharge, in one embodiment, to a collection mechanism as shown in FIG. 2. Such dense particles 58 are conducted through a conduit 64 and are blown by means of an exteriorly-mounted blower 66 to a further dense particle collection vessel 68. However, in other embodiments reclaimed material is discharged into a container. Disposed at the top 45 of reaction vessel 42 the fines 50 are drawn by vacuum aspiration fan 52 through a fines conduit 70 to a fines collection vessel 72 for subsequent disposal and/or further processing. In regard to further processing, the fines 52 may be reprocessed in the same or differently adjusted aspirator mechanism. Also the more dense thermoplastic resin particles 58 may be additionally reprocessed to remove additional amounts of foam 16 and/or vinyl 14 therefrom. (See step 28 in FIG. 3.) The net result is to enrich further the concentration of the more useful thermoplastic resin 12 in the retained portion.

It is noted that during separation of the more dense thermoplastic resins 58, the vinyl particles may likewise be separated from the foam particles also based upon the differing densities between the vinyl particles and the foam particles thereby to form enriched respectively foam and vinyl fractions. The vinyl fraction may then be discarded, if desired (step 30), and the foam fraction collected for reuse (step 32). Although in some preferred embodiments of the present invention two serial passes are sufficient to enrich the concentration of the thermoplastic resin particles to desired amounts, additional serial passes (step 28) may be utilized for that purpose to form thermoplastic resin particle concentrations of sufficient purity for recycling use in the reaction injection mold (RIM) to form additional workpieces (step 34).

Various types of foams can be processed by the method of the present invention, including polyurethane foams. Thermoplastic resins which can be processed include glass filled styrene resin, e.g. the 20% fiberglass by weight styrene resin sold under the trademark "Dylark" by Arco Chemical Co. Other thermoplastic resins, including but not limited to ABS, polycarbonate, polypropylene, polyethylene, may be processed, as long as they have a density difference which is sufficient to permit separation utilizing the density-based separation principles, as discussed herein.

Vinyl resin which can be processed in preferred embodiments of the present method invention include, for example, ABS/PVC vinyl. Vacuumed formed vinyl skin and cast vinyl skin, having slightly more rubbery properties, may be processed. Other processable types of vinyl and resins having the same or similar physical properties will be apparent to those of ordinary skill in the art.

It is understood that in carrying out the preferred aspects of the present method, there is created a fraction of very small particles, "fines," which may approximate the size the grains of sand or smaller, formed of each of the foam, vinyl and thermoplastic resin components. In at least some embodiments, the fines may not be practically separated using the density-based separation equipment because of their small size.

Upon two serial passes of the dense fraction 58 collected from separator 34, it has been found that contaminants of vinyl and foam in dense fraction 58 may total approximately 3.3% by weight or less. Such second dense fraction has been found to contain at least 70% by weight of the thermoplastic resin contained within the ground scrap lamination as first passed to a density-based separator 34. However, it is contemplated that larger amounts of recovery by weight are within the scope of the present invention. It is presently believed that the remaining amounts of thermoplastic resin are lost partially to the discardable fines, and also represent contaminants within the separated vinyl and separated foam respective fractions. Of course, these latter fractions may be reprocessed through additional serial passes in the density-based separator equipment 34.

The scrap lamination 10 as used in the present invention may be ground utilizing various grinding equipment known to those of ordinary skill in the art, although in one particular preferred embodiment a grinding screen containing orifices of approximately ¼" diameter has been utilized. One suitable granulator to grind the foam scrap is available from the Polymer Machinery Corporation, Berlin, Conn.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

I claim:

1. An improved method of separating into individual components scrap lamination from a reaction injection molding process, said method comprising the steps of:
    obtaining scrap lamination comprising an inner foam layer having a skin on one side thereof and a thermoplastic resin substrate on the other side;
    cooling said scrap laminate to a temperature sufficient to materially avoid plasticization of said scrap laminate during grinding;
    grinding the scrap lamination while in said non-plasticization, cooled state to form an aggregate formed of interspersed foam, skin and thermoplastic resin particles and collecting the resulting ground aggregate;
    passing the aggregate to a density-based separator, and collecting the first dense fraction therefrom comprising an enriched concentration of thermoplastic resin particles; and
    serially passing the first dense fraction to a density-based separator to provide a second dense fraction which is further enriched in concentration of the thermoplastic resin.

2. The improved method of separating reaction injection mold scrap lamination of claim 1 further comprising the step of separating the skin particles from the foam particles simultaneously with separation of the second dense fraction including enriched concentrations of the thermoplastic resin.

3. The improved method of separating reaction injection mold scrap lamination of claim 2 wherein density-based separator means are utilized for such simultaneous foam and skin separations.

4. The improved method of separating reaction injection mold scrap lamination of claim 1 including sufficient passes of the dense fraction including enriched concentrations of the thermoplastic resin particles to provide a dense fraction having a thermoplastic resin particle concentration of sufficient purity for recycling use in injection molding.

5. The improved method of separating reaction injection mold scrap lamination of claim 1, comprising the further step of separately collecting a fraction having a substantial concentration of foam particles.

6. The improved method of separating reaction injection mold scrap lamination of claim 1 wherein said foam comprises a polyurethane foam.

7. The improved method of separating reaction injection mold scrap lamination of claim 1 wherein said thermoplastic resin comprises a glass-filled styrene resin.

8. The improved method of separating reaction injection mold scrap lamination of claim 1 wherein the foam is chemically bonded to and between the skin and to thermoplastic resin substrate.

9. The improved method of separating reaction injection mold scrap lamination of claim 1 wherein the skin comprises a vinyl resin.

10. The improved method of separating reaction injection mold scrap lamination of claim 1 comprising the further step of separately collecting a fraction of fines comprising very small particles of foam, skin and thermoplastic resin substantially the size of sand grains and smaller.

11. The improved method of separating reaction injection mold scrap lamination of claim 1 wherein the liquified gas comprises liquid nitrogen.

12. The improved method of separating reaction injection mold scrap lamination of claim 1 wherein the second dense fraction collected from the second pass serially to a density-based separator contains contamination of skin and foam in total amount of approximately 3.3% by weight.

13. The improved method of separating reaction injection mold scrap lamination of claim 1 wherein the second dense fraction contains at least 70% by weight of the thermoplastic resin contained within the ground scrap lamination as first passed to a density-based separator.

14. The improved method of separating reaction injection mold scrap lamination of claim 1 wherein the scrap lamination is ground utilizing a screen containing orifices approximately ½ inch in diameter.

15. The improved method of separating reaction injection mold scrap lamination of claim 1 wherein the liquified gas utilized during the step of grinding the scrap lamination has a temperature sufficiently low to prevent plasticization of the laminated material.

* * * * *